Feb. 23, 1937.  A. J. SCHUTT  2,071,583
METHOD OF MAKING BELLOWS
Filed May 5, 1933
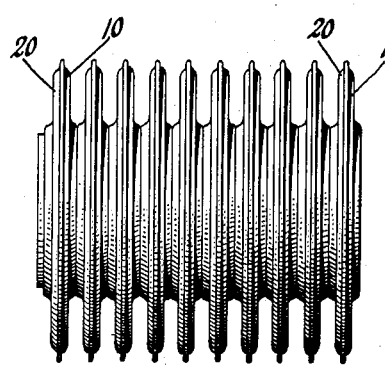
Fig. 1
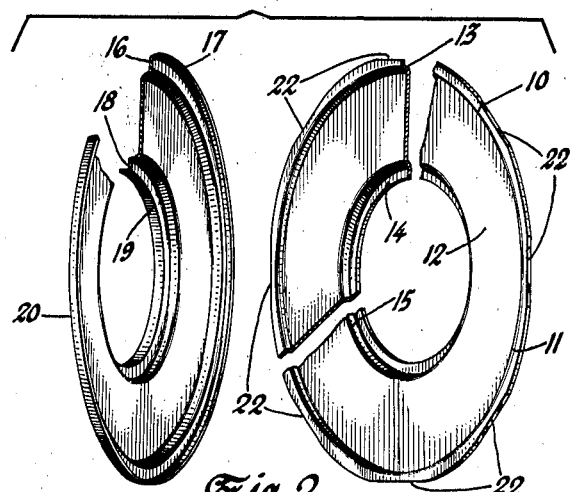
Fig. 2
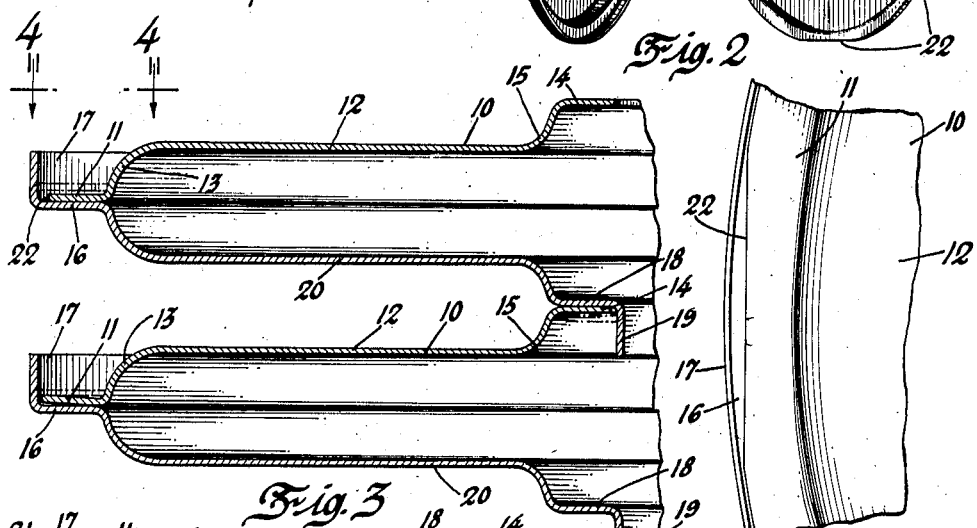
Fig. 3
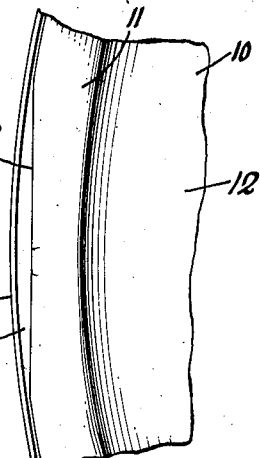
Fig. 4
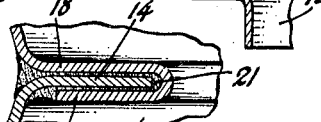
Fig. 5
Fig. 6
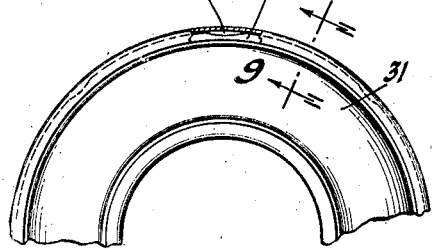
Fig. 7
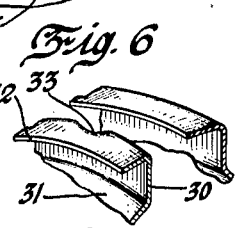
Fig. 8
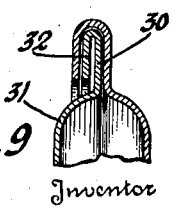
Fig. 9
Inventor
Arthur J. Schutt
By Blackmore, Spencer & Flint
Attorneys Patented Feb. 23, 1937

2,071,583

UNITED STATES PATENT OFFICE 2,071,583

METHOD OF MAKING BELLOWS

Arthur J. Schutt, Lockport, N. Y., assignor, by mesne assignments, to General Motors Corporation, Detroit, Mich., a corporation of Delaware Application May 5, 1933, Serial No. 669,478

4 Claims. (Cl. 113—112)

Bellows of the "built-up" type, i. e., bellows which consists of a number of discs of flexible metal which are joined one to another at their peripheries, cannot be satisfactorily employed in installations in which they are subject to appreciable fluid pressure unless the several discs are united by joints which constitute hermetic seals which will withstand the strains imposed on them as a result of the flexing which occurs when the bellows expands and contracts. Attempts have been made to produce built-up bellows with hermetically sealed joints which will withstand the strains imposed on them as a result of flexing of the bellows by joining the discs by spinning or crimping, by soldering and by a combination of these methods, but these attempts have not resulted in a uniformly satisfactory product.

The reason that the simple spun or crimped joints and the simple soldered joints have not resulted in a uniformly satisfactory product is quite apparent. It is difficult, if not impossible, to produce a hermetic seal by spinning or crimping and it is almost certain that if one is initially obtained flexing of the bellows will eventually result in a shifting of the elements of the joint to a sufficient extent to rupture the hermetic seal. A simple soldered joint is not satisfactory because it has not sufficient mechanical strength to withstand the strains imposed on it as a result of the flexing which occurs when the bellows expands and contracts. From an analysis of the defects of simple spun or crimped joints and of simple soldered joints, it would appear that by joining the discs both by spinning or crimping and by soldering it is possible to produce in a built-up bellows a hermetically sealed joint which is capable of withstanding the strains imposed on it as a result of flexing of the bellows. And this I have found to be correct.

From my experiments, I have concluded that the reason that, prior to the date of my invention, it has been considered not possible to produce uniformly satisfactory bellows with joints made by spinning or crimping and by soldering is that those working in this field failed to obtain good solder bonds between the discs.

My invention comprehends an improved method of manufacturing built-up bellows in which the discs are joined by spinning or crimping and by soldering and which insures the formation of a good solder bond between the discs, certain improvements in the form of one or more of the discs which insures the formation of a good solder bond between the discs, and the product resulting from the previously mentioned improvement viz., a built-up bellows in which the discs are joined by spinning or crimping and by a good solder bond.

For a better understanding of the nature and objects of my invention, reference is made to the accompanying drawing and to the following specification in which my invention is described.

In the accompanying drawing:

Figure 1 is a side elevation of a bellows in accordance with my invention.

Figure 2 is an enlarged exploded view showing, in perspective, with sections removed, discs of the two types from which the bellows shown in Figure 1 is made.

Figure 3 is a frgamentary, further enlarged, longitudinal section through an assembly of discs of the types shown in Figure 2, showing, in solid lines, the positions of the parts before the discs have been interlocked and, in dash-and-dot lines, the positions of the parts after the discs have been interlocked but before the joints have been soldered.

Figure 4 is a fragmentary view taken as indicated by the line 4—4 of Figure 3.

Figures 5 and 6 are, respectively, still further enlarged sections through one of the outer joints and through one of the inner joints of the bellows shown in Figure 1.

Figure 7 is a fragmentary end elevation, with a part broken away and in section, of a bellows of modified form.

Figure 8 is a fragmentary exploded view, showing in perspective, discs of the two types from which the bellows shown in Figure 7 is made.

Figure 9 is a fragmentary section, taken on the line 9—9 of Figure 7, through an assembly of discs of the types shown in Figure 8 after the discs have been interlocked but before the joints have been soldered.

The bellows illustrated in Figures 1 to 6 of the drawing is made of a number of concavo-convex annular discs stamped out of thin, flexible and resilient sheet metal. These discs are of two types which, for the sake of convenience, may be referred to as "inner" and "outer", respectively.

Each of the inner discs, which are designated by the reference character 10 in the drawing, consists of a shallow cup-shaped body on whose outer edge there is provided an outwardly extending circumferential flange 11 which is connected to the end wall 12 of the body by a rather sharply curved section 13 which forms the side wall of the body. In the end wall of the body, there is provided a central opening which is bounded by an inwardly extending circumferential flange 14 which is located on the side of the end wall 12 opposite that on which the flange 11 is located and is connected to the end wall by a rather sharply curved section 15. The flanges 11 and 14 are located in planes which are disposed at approximately right angles to the axis of the disc.

Except in that their external diameters are slightly greater and their internal diameters slightly less than the corresponding dimensions of the inner discs and in that there are provided on the flanges 16 which correspond to the flanges 11 of the inner discs circumferential flanges 17 which extend outwardly at approximately right angles thereto and on the flanges 18 which correspond to the flanges 14 of the inner discs circumferential flanges 19 which extend outwardly at approximately right angles thereto, the outer discs 20 do not differ substantially from the inner discs insofar as the latter have hereinbefore been described.

To produce a bellows from the discs hereinbefore described, a stack of the discs is formed, as illustrated in Figure 3, by seating the flange 11 of one of the inner discs on the flange 16 of one of the outer discs and within the boundaries of the flange 17 thereof with the concave sides of the discs facing each other, seating the flange 18 of another outer disc on the flange 14 of the mentioned inner disc with the flange 19 of the outer disc projecting through the central opening in the inner disc and with the convex sides of the discs facing each other, superposing another inner disc upon the last-mentioned outer disc in the manner above-described, and repeating the foregoing steps until an assembly with the desired number of convolutions has been produced.

The assembly produced in the manner described in the paragraph next preceding this is then placed in a spinning machine wherein, as is indicated in Figure 3, the flanges 17 and 19 of the outer discs are folded over and into substantial parallelism with the flanges 11 and 14 of the immediately adjacent inner discs, thus locking the several discs together.

After the discs have been locked together in the manner described in the paragraph next preceding this, the assembly is placed in a soldering machine in which it is rotated about its axis through a bath of molten solder. During this operation, the inner and outer faces of the flanges 11 of the inner discs become united by solder to the juxtaposed faces of the flanges 16 and 17 of the immediately adjacent outer discs and the inner and outer faces of the flanges 14 of the inner discs become united by solder to the juxtaposed faces of the flanges 19 and 18 of the immediately adjacent outer discs, as is clearly shown in Figures 5 and 6 in which the reference character 21 indicates the solder bond. This operation also effects a "tinning" of the outsides of the discs.

The soldering operation completes the formation of the bellows. After this operation has been completed, the bellows is in condition to be installed in the apparatus with which it is to be used or of which it is to form a part.

To insure hermetic seals between the discs and the necessary mechanical strength in the joints, in a bellows of the type with which this application is concerned, there should be a continuous circumferentially complete solder bond between the flanges 11 of the inner discs and the flanges 16 of the immediately adjacent outer discs and between the flanges 14 of the inner discs and the flanges 18 of the immediately adjacent outer discs and a substantial although not necessarily continuous circumferentially complete solder bond between the flanges 11 of the inner discs and the flanges 17 of the immediately adjacent outer discs and between the flanges 14 of the inner discs and the flanges 19 of the immediately adjacent outer discs.

A solder bond of the desired characteristics is obtained at the inner joints between the discs by merely rotating the disc assembly through a bath of molten solder in the manner previously described since, during this operation, solder naturally flows into the spaces between the flanges 14 of the inner discs and the flanges 18 of the immediately adjacent outer discs and forms a continuous circumferentially complete bond between these flanges and sufficient solder to form a substantial if not a continuous circumferentially complete bond between the flanges 14 of the inner discs and the flanges 19 of the immediately adjacent outer discs naturally flows from these spaces around the outer edges of the flanges 14 into the communicating spaces between the flanges 14 and 19.

It will, however, be noted that a solder bond of the desired characteristics is not so naturally obtained at the outer joints between the discs as a result of the soldering operation which has been described since solder from the bath enters directly, not into the spaces between the flanges 11 of the inner discs and the flanges 16 of the immediately adjacent outer discs, but into the spaces between the flanges 11 of the inner discs and the flanges 17 of the immediately adjacent outer discs and enters the first-mentioned spaces only from the last-mentioned spaces. From what has been said in the sentence next preceding this, it will be apparent that unless solder can flow around the edges of the flanges 11 from the spaces between the flanges 11 and 17 into the communicating spaces between the flanges 11 and 16 at points distributed around the circumferences of the flanges 11 and located sufficiently closely together that the natural flow and spread of the solder which enters the spaces between the flanges 11 and 16 will result in a continuous circumferentially complete solder bond between these flanges, a solder bond of the desired characteristics will not be obtained at the outer joints between the discs.

To insure that solder will flow around the outer edges of the flanges 11 from the spaces between the flanges 11 and 17 into the communicating spaces between the flanges 11 and 16 at points so distributed around the circumferences of the flanges 11 as to insure the formation of a continuous circumferentially complete solder bond between the flanges 11 and 16, any expedient by means of which the edges of the flanges 11 are maintained radially spaced from the curved sections which connect the flanges 16 and 17 throughout their circumferences or at a sufficient number of points distributed around their circumferences may be adopted. Among these expedients may be mentioned the provision of substantially equally spaced projections on the edges of the flanges 11 and the provision of substantially equally spaced indentations or projections in the curved sections which connect the flanges 16 and 17. However, I consider the expedient illustrated in the drawing, viz., the provision of scallops 22 in the outer edges of and equally spaced around the circumferences of the flanges 11, most practical and best adapted to effect the desired end.

It will be noted, since the end walls of the inner and outer discs, instead of merging gradually into the flanges 11 and 14 and 16 and 18, are connected thereto by rather sharply curved sections, that when the discs have been assembled into a bellows in the manner which has been described, the juxtaposed connected sections diverge sharply instead of gradually from each other and, consequently, the depth of the body of solder which is retained between the juxtaposed connected sections by surface tension is much less than it would be if the end walls merged gradually into the flanges. This feature is important because it results in an increase in the flexible area of the disc and, consequently, decreases the liability of rupture of the discs as a result of flexing of the bellows.

In Figures 7, 8 and 9, there is shown a slightly modified form of the bellows which is shown in the preceding figures. The bellows shown in Figure 7, 8 and 9 differs from that shown in the preceding figures only in that there are provided on the outer edges of the flanges 30 of the inner discs 31 which correspond to the flanges 11 of the inner discs 10 circumferential inwardly extending flanges 32 which are folded over and onto the flanges 30 during the spinning or crimping operation and in that in the curved sections which connect the flanges 30 and 32 there are provided a number of spaced indentations 33 for the same purpose as the scallops in the inner discs 10.

The bellows herein disclosed may be used for any purpose for which bellows of the conventional types are used but is particularly designed for use in thermo-sensitive elements such as are commonly employed to operate cooling water flow control valves and radiator shutters of automotive vehicles.

The natural form of a built-up bellows is that which it assumes, while free to expand and contract axially, after the joints between the discs have been completed. While it is in this form, it can quite easily be contracted axially but can be expanded axially only with difficulty. In view of this fact and the fact that a built-up bellows is inherently better able to withstand, when in its natural form, the internal strains which result from forces which tend to contract it axially than the internal strains which result from forces which tend to expand it axially, a bellows of the built-up type should be installed in the apparatus with which it is to be used or of which it is to form a part so that there will never be applied to it forces which tend to expand it to a greater length than that which it assumes when it is in its natural form.

I claim:

1. The method of manufacturing bellows from flexible metal annuli which includes providing annuli having means for affording when assembled enlarged soldering channels spaced about their peripheries, assembling said annuli with a margin of one seated on a margin of another, folding the margin of one annulus onto the margin of the other so as to interlock and leave a joint for soldering having spaced enlarged channels through which solder may flow from one side to the other of the enfolded margin, and introducing molten solder into the joint.

2. The method of manufacturing bellows from flexible metal annuli which includes providing annuli having means for affording when assembled enlarged soldering channels spaced about their peripheries, assembling said annuli with a margin of one seated on a margin of another, folding the margin of one annulus onto the margin of the other so as to interlock and leave a joint for soldering having spaced enlarged channels through which solder may flow from one side to the other of the enfolded margin, and rotating the margins of the annuli through a bath of molten solder.

3. In the manufacture of bellows which consist of flexible metal annuli interlocked by folding the margin of one over the margin of another; the steps of forming the edge of the enfolded margin with protuberances spaced around its periphery, folding the margin of another annulus over the enfolded margin so as to form a joint for soldering having spaced enlarged channels through which solder may flow from one side to the other of the enfolded margin, and introducing molten solder into the joint.

4. In the manufacture of bellows which consist of flexible metal annuli interlocked by folding the margin of one over the margin of another; the steps of forming the edge of the enfolded margin with cut-away portions spaced around its periphery, folding the margin of another annulus over the enfolded margin so as to form a joint for soldering having spaced enlarged channels through which solder may flow from one side to the other of the enfolded margin, and introducing molten solder into the joint.

ARTHUR J. SCHUTT.